United States Patent [19]

Fässle et al.

[11] Patent Number: 4,749,431

[45] Date of Patent: Jun. 7, 1988

[54] PROCESS FOR PRODUCING MOLDS, MODELS AND TOOLS BASED ON HARD GYPSUM AND/OR CEMENT

[75] Inventors: Fritz Fässle, Limburgerhof; Neville H. Clubbs, Mannheim; Siegmund Stadler, Dudenhofen, all of Fed. Rep. of Germany

[73] Assignee: Giulini Chemie GmbH, Ludwigshafen am Rhein, Fed. Rep. of Germany

[21] Appl. No.: 867,698

[22] Filed: May 28, 1986

[30] Foreign Application Priority Data

May 30, 1985 [DE] Fed. Rep. of Germany ....... 3519367

[51] Int. Cl.[4] ........................ B32B 13/02; B32B 13/04; B32B 31/12

[52] U.S. Cl. .................................... 156/245; 156/247; 106/38.2; 106/38.3; 106/103; 106/109; 264/220; 264/225; 264/240; 264/241

[58] Field of Search ................ 156/245, 247; 106/103, 106/109, 38.2, 38.3; 264/219, 220, 225, 240, 241, DIG. 43, 260

[56] References Cited

U.S. PATENT DOCUMENTS

| | | | |
|---|---|---|---|
| 4,067,939 | 1/1978 | Lowe et al. | 264/42 |
| 4,072,534 | 2/1978 | Ryder | 106/109 |
| 4,127,628 | 11/1978 | Uchida | 264/42 |

FOREIGN PATENT DOCUMENTS

| | | | |
|---|---|---|---|
| 124801 | 4/1984 | European Pat. Off. | |
| 2217587 | 10/1973 | Fed. Rep. of Germany | |
| 77796 | 1/1984 | Fed. Rep. of Germany | |
| 206966 | 2/1984 | Fed. Rep. of Germany | 264/240 |
| 141321 | 12/1978 | Japan | 264/240 |
| 1119585 | 11/1966 | United Kingdom | |

OTHER PUBLICATIONS

Chemical Abstracts, vol. 89, p. 265, #64024f.

*Primary Examiner*—Michael Wityshyn
*Assistant Examiner*—Lori Cuervo
*Attorney, Agent, or Firm*—Spencer & Frank

[57] ABSTRACT

A process for producing molds, models and tools from hard gypsum and/or cement including applying at least one base layer composed of a binder to a model from which a mold is to be made and which has been provided with an unmolding agent, and pressing onto this base layer a glass fiber reinforced molding composition composed of 95 to 0 weight % α-calcium sulfate hemihydrate, 0 to 95 weight % cement, 0.5 to 8 weight % glass fibers and 0.5 to 4 weight % suspension agent, with reference to the dry weight, as well as water in a wet-on-wet process and unmolding the resulting laminate after it has set.

18 Claims, 1 Drawing Sheet

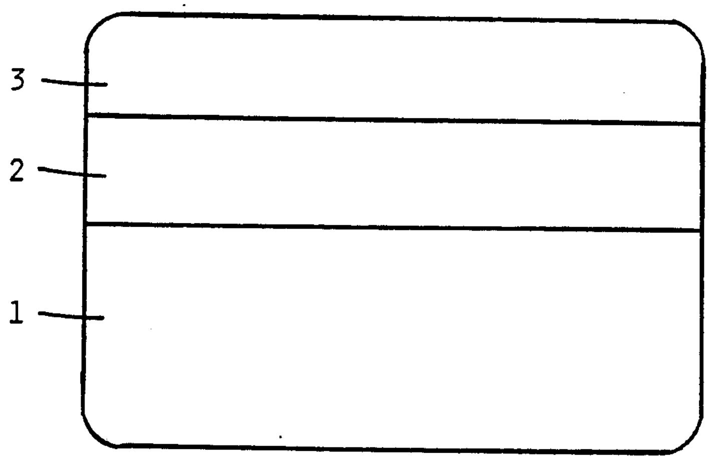
3
2
1

PROCESS FOR PRODUCING MOLDS, MODELS AND TOOLS BASED ON HARD GYPSUM AND/OR CEMENT

BACKGROUND OF THE INVENTION

Glass fiber reinforced gypsum and glass fiber reinforced cement are known. According to the terminology used herein, glass fiber reinforced substances are compound materials, that is materials produced by embedding a first substance present in the form of particles, whiskers, fibers, laminae or unoriented fibers in a second substance—the matrix. Cement, for example, is a compound material used in the construction industry. The use of such compound materials in laminates for the production of molds, models and tools has not been known.

A significant and economically important sector in the construction of vehicles, ships and particularly aircraft is known to be the construction of molds. Molds and tools having specific characteristics are required today for the production of more and larger vehicle parts. In addition to metals, e.g. electroplated nickel, woven structures of glass or carbon fiber reinforced epoxy resins are used for this purpose. Originals and copied models are frequently produced from epoxy resins reinforced with woven fibers or from unsaturated polyester resins reinforced with woven fibers. Like the molds, these models have a high surface quality and can be produced much more cost effectively than metal models.

It is also known that plastic molds made of epoxy resins or unsaturated polyester resins reinforced with glass fiber fabrics can also be used for the production of smaller models employing the wet pressing, injection molding and vacuum drawing methods, with lightweight molds being provided with reinforcing ribs. If high pressures are employed, the molds are lined with more stable materials, e.g. mixtures of epoxy resin and quartz sand. Compared to steel molds, plastic molds are more economical and are an appropriate supplement for the economical development of prototypes.

European Patent Application No. 124,801 and German Patent No. 77,796 disclose the production of molds based on $\beta$-calcium sulfate hemihydrate and/or cement. However, it is characteristic for these and other prior art processes that all the molds produced are porous, they absorb moisture and are gas permeable. The mechanical characteristics of such molds are not sufficient for their use in vehicle and aircraft construction. These molds cannot be used even if particles, e.g. whiskers, glass fibers and the like, are embedded in the pourable molding compositions, which still produce porous compound substances on a gypsum or cement basis.

According to British Patent No. 1,119,585, on a cement base are produced in such a manner that initially a liquid resin layer, composed of epoxy resin and hardener is cooled in a mold to at least 30° C. and then a cement containing layer is poured onto the viscous resin layer. It is important in this process that both layers harden at the same time and are thereby bonded firmly with one another. Mold bodies produced in this manner have a surface layer of synthetic resin on their cement containing base layer. However, this process is also unsuitable for the production of molds for large structural components or models.

Gypsum or cement bound molding compositions have therefore not previously been used to the same extent as the synthetic resin bound molding compositions in the construction of tools, molds and models.

Gypsum molds have not previously been used in this field because their strength is too low, due to their high porosity, and because their expansion is too high. The result is that their retention of dimensions and their moldability have not been sufficient.

SUMMARY OF THE INVENTION

The present invention provides a process for producing molds, models and tools of glass fiber reinforced hard gypsum and/or glass fiber reinforced cement, particularly molds, models and tools for the automobile, aircraft and ship building industries and for sanitary applications.

It is thus an advantage of the invention to provide a process for producing models, molds and tools, with such a process having a shorter manufacturing duration and involving lower costs.

BRIEF DESCRIPTION OF THE DRAWING

The FIGURE illustrates a substrate (1) such as a model from which a mold is to be made. At least one base layer of a binder (2) is applied to the substrate, and a glass fiber reinforced molding composition (3) is pressed onto the base layer in a wet-on-wet process.

DETAILED DESCRIPTION OF THE INVENTION

The present invention provides a process in which at least one base layer of a binder is applied to the model from which a mold is to be made. A glass fiber reinforced molding composition consisting essentially of about 95 to 0 weight % $\alpha$-calcium sulfate hemihydrate and 0 to about 95 weight % cement (it being understood that the sum of the weight percentages of said $\alpha$-calcium sulfate hemihydrate and said cement must total between about 88 and about 99 weight percent), about 0.5 to about 8 weight % glass fibers and about 0.5 to about 4 weight % suspension agent as well as water is then applied to this base layer in a wet-on-wet process and the resulting laminate is unmolded after it has set. The above weight percentages refer to the dry molding composition.

The water content of the molding composition is advisably selected so that a kneadable mass results which can be used to line molds made of gypsum or plastic. In the above mixtures, the water content will generally lie between about 20 and about 28 weight %, and more particularly between about 22 and about 26 weight %, with reference to the dry mixture, but the invention is not restricted to these quantities of water. Generally, the water/gypsum factor and the water/cement factor lie near the stoichiometrically required amount of water so that dense molds are produced whose mechanical characteristics can be additionally improved by the glass fiber content.

The glass fiber content of the molding composition preferably lies between about 2 and about 4 weight %. The glass fiber reinforced molding composition lines the mold parts in such a manner that they are able to withstand even the heaviest loads, particularly in the form of higher pressures. The length of the glass fibers should be about 4 to about 12 mm, particularly about 5 to about 8 mm, their diameter about 10 to about 15 $\mu$m. The glass fiber containing molding composition can also be applied "wet on wet" to the last base layer. With the use of an adhesion promoting agent, the molding composition can also be applied to a base layer that has already set, but this must also be done in a wet-on-wet process.

The average grain size of the calcium sulfate hemihydrate crystals and of the cement particles preferably lies between about -and about 30 μm.

Suspension agents are here understood to mean mixtures containing accelerators, inhibitors and plasticizers, possibly also pH regulators and expansion regulators.

The inclusion of air and air bubbles can be avoided by applying at least one base layer of a binder onto the model that has been coated with a release agent. Preferably, however, two such layers are applied. The base layers are best applied by brushing them onto the release coating which is, for example, a layer of a hard wax, with the first layer having a thickness of approximately about 0.1 to about 5 mm and the second layer, which serves as reinforcement, being about 1 to about 6 mm thick. The significant factor here is that the base layers are applied "wet on wet", i.e. the binding process of the already applied layer is not yet completed when the next layer is brushed on. Only in this way is good adhesion assured between the layers of the laminate. Once the binding process is completed, an adhesion promoting agent must be used.

The binder of the base layers may be an epoxy surface resin. Or, the dry α-calcium sulfate hemihydrate and/or cement containing molding composition, which has not yet been mixed with glass fibers, can be used as binder, to which somewhat more water is then added than is required for the molding composition so that it becomes spreadable. The added amount of water may lie, for example, between about 26 and about 31 weight %, with reference to the dry weight of the binder. The second base layer serves essentially to reinforce the first base layer that is suitable for molding difficult contours and makes possible the production of molds having smooth surfaces.

Epoxy surface resins that are available in the trade were used, e.g. those manufactured by the firm Lechler of Stuttgart or the firm Ciba-Geigy. Suitable, for example, are Rezolin® Epo S1, Araidit®SW 404, Araloit®SV 410 and Araldit®SV 414.

Suitable adhesion promoting agents may be a gypsum adhesive composed of about 95 weight % α-calcium sulfate hemihydrate, about 0.5 to about 2 weight % suspension agent and about 1 to about 4.5 weight % polyvinyl acetate (EPV). Added to this mixture are about 20 to about 28 weight % water, with reference to the dry adhesive mixture.

If the last base layer is composed of an epoxy surface resin which has already set, this layer must be roughened and then an adhesion promoting agent must be applied onto which the molding composition according to the present invention is then applied in a wet-on-wet process. The adhesion promoting agent applied here may be an epoxy surface resin that may be identical with the resin of the base layer.

EXAMPLE 1

In order to obtain work processing time of at least 30 minutes, 15 kg finely crystalline α-calcium sulfate hemihydrate having an average grain size of about 25 μm were mixed homogeneously for 30 minutes in a worm mixer with 150 g calcium salt of an N-polyoxymethylene amino acid (inhibitor)
750 g potassium sulfate (expansion control)
15 g methyl cellulose (plasticizer) and
12 g white lime to regulate the pH.

5kg of this mixture were taken from the mixer. The remainder of about 11 kg was mixed with 0.3 kg glass fiber shreds of a length of 6 mm and a maximum width of 13 mm; this mixing required about 10 minutes. The model from which a mold was to be made and which had been treated with an emulsion of hard wax to facilitate unmolding, was then provided with two base layers. For this purpose, the 5 kg of the removed hard gypsum mixture were intensively mixed with 1.35 l water. This spreadable mass was initially brushed onto the model in a thin layer. When the layer began to become dull on the surface, a second layer of about 5 mm was applied from the same composition. Immediately thereafter, the gypsum mixture containing the glass fiber shreds was mixed with 2.5 l water. The resulting paste was applied wet on wet, i.e. before the already applied base layers had set, to a thickness of about 15 mm. The entire work process on the model was completed after about 25 minutes. Unmolding was possible already after 120 minutes. The following final strength values were measured:

bending tensile strength: 19.5 $N/mm^2$
compressive strength: 56 $N/mm^2$
Expansion after setting was around 0.025%

EXAMPLE 2

In order to obtain work processing time of at least 30 minutes, 10.5 kg of finely crystalline α-hemihydrate having an average grain size of about 25 μm and 4.5 kg cement (Dyckerhoff white) were mixed homogeneously for 30 minutes in a worm mixer with 90 g calcium salt of an N-polyoxymethylene amino acid (inhibitor)
500 g potassium sulfate (expansion control) and
15 g methyl cellulose (plasticizer).

Of this mixture, 1.5 kg were removed as in Example 1 and the remaining 10 kg were mixed homogeneously with 0.3 kg glass fiber shreds. Further processing was analogous to the mode of operation of Example 1. Here again the entire work process was completed after about 25 minutes. Unmolding could take place after 120 minutes. The following final strength values were measured:

bending tensile strength: 19 $N/mm^2$
compressive strength: 62.5 $N/mm^2$
Expansion after setting was about 0.005 %.

EXAMPLE 3

In order to obtain work processing time of at least 30 minutes, 10.5 kg cement (Dyckerhoff white) and 4.5 kg finely crystalline α-calcium hemihydrate having an average grain size of about 25 μm were homogeneously mixed for 30 minutes in a worm mixer with 50 g calcium salt of an N-polyoxymethylene amino acid (inhibitor)
500 g potassium sulfate (expansion control) and
15 g methyl cellulose (plasticizer).

Of this mixture, 5 kg were removed as in Example 1 and the remaining 10.5 kg were mixed for 10 minutes with 0.3 kg glass fiber shreds having a length of 6 mm and a maximum width of 0.5 mm. Processing of this material continued as in Example 1. The entire work process was completed after 25 minutes. Unmolding could take place after 12 hours. The following final strength values were measured:

bending tensile strength: 18 $N/mm^2$ compressive strength: 75 $N/mm^2$

Expansion after setting was about 0.

EXAMPLE 4

In order to obtain work processing time of at least 30 minutes, 10 kg finely crystalline α-calcium sulfate hemihydrate having an average grain size of about 25 μm were homogeneously mixed for 30 minutes in a worm mixer with 150 g calcium salt of an N-polyoxymethylene amino acid (inhibitor)

750 g potassium sulfate (expansion control) and 15 g methyl cellulose (plasticizer)

12 g white lime in order to regulate the pH to pH 7–8, and adding 0.3 g glass fiber shreds of a length of 6 mm and a maximum width of 0.5 mm.

After carefully applying the release agent, a 1 mm thick epoxy surface resin layer was applied. When the epoxy resin surface had started to gel and was still sticky, a second layer of the same resin was applied, likewise to a thickness of 1 mm. After application of the second resin layer, the initially prepared powder mixture of 11 kg was mixed with 2.5 l water to form a doughy mass. This kneadable mass was applied wet-on-wet to the second resin layer until a thickness of 10–15 mm had been reached. The entire work process was completed after about 35 minutes. The gypsum mold could be removed after 4 hours and heating to 40° C. The following final strength values were measured:

bending tensile strength: 18.0 $N/mm^2$ compressive strength: 57.2 $N/mm^2$

Expansion after setting was about 0.03%.

EXAMPLE 5

The powder mixture was produced as in Example 2, adding 3% glass fibers. Epoxy resin coatings were made as in Example 4, then the doughy gypsum mass was applied, as in Example 4. The entire work process was completed after 35 minutes. Unmolding could take place after about 120 minutes. The following final strength values were measured:

bending tensile strength: 17.6 $N/mm^2$ compressive strength: 54.1 $N/mm^2$

Expansion after setting was about 0.015%.

EXAMPLE 6

The powder mixture was produced as in Example 3. Application of the epoxy resin coatings was done as in Example 4. Mixing the gypsum dough occurred as in Example 3, as did the coating. The entire work process was completed after 35 minutes. Unmolding could take place after about 12 hours. The following final strength values were measured:

bending tensile strength: 17 $N/mm^2$ compressive strength: 64 $N/mm^2$

Expansion after setting was about 0.01 %.

CROSS REFERENCE TO RELATED APPLICATION

This application corresponds to application No. P 35,19,367.0 filed May 30th, 1985 in the Patent Office of the Federal Republic of Germany.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A process for producing molds, models and tools for automobile, aircraft and ship building, comprising:

applying at least one base layer of a binder to an automobile, aircraft, or ship model from which a mold is to be made, applying a glass fiber reinforced molding composition as a kneadable mass to said base layer in a wet-on-wet process, said molding composition comprising about 95 to 0 weight % α-calcium sulfate hemihydrate, 0 to about 95 weight % cement, said α-calcium sulfate hemihydrate and/or said cement comprising between about 88 and 99 weight %, about 0.5 to about 8 weight % glass fibers and about 0.5 to about 4 weight % suspension agent, with reference to the dry weight, as well as water, and unmolding the resulting laminate after setting.

2. The process as set forth in claim 1, wherein two base layers of the same binder are applied to the model in a wet-on-wet process.

3. The process as set forth in claim 1, wherein a binder composed of about 99.5 to 0 weight % α-calcium sulfate hemihydrate, 0 to about 99.5 weight % cement and about 0.5 to about 4 weight % suspension agent, with reference to the dry weight, as well as water is applied as at least one base layer.

4. The process as set forth in claim 3, wherein a binder is applied whose water content is about 26 to about 31 weight %, with reference to the dry binder.

5. The process as set forth in claim 1, wherein the glass fiber reinforced molding composition is applied to the base layer immediately before the end of setting of the base layer.

6. The process as set forth in claim 1, wherein the glass fiber reinforced molding composition is applied in a wet-on-wet process to the base layer which has been provided with an adhesion promoting agent after said base layer has set.

7. The process as set forth in claim 1, wherein a molding composition is applied as a kneadable mass whose water content lies between about 20 and about 28 weight %, particularly between about 22 and about 26 weight %, with reference to the dry mixture.

8. The process as set forth in claim 1, wherein a molding composition is applied whose α-calcium sulfate hemihydrate content is about 90 to about 10 weight % and whose cement content is 0 to about 80 weight %.

9. The process as set forth in claim 1, wherein a binder composed of epoxy surface resin and hardener is applied by brushing.

10. The process as set forth in claim 9, wherein the glass fiber reinforced molding composition is applied in a wet-on-wet process onto the base layer which has been provided with a adhesion promoting agent.

11. The process as set forth in claim 1, wherein an α-calcium sulfate hemihydrate and/or a cement are used having an average grain size of 15 to 30 μm.

12. The process as set forth in claim 1, including applying a release agent to said model before applying said binder.

13. A process for producing an automobile mold, comprising:

applying at least one base layer of a binder to an automobile model from which a mold is to be made, applying a glass fiber reinforced molding composition as a kneadable mass to said base layer in a wet-on-wet proces, said molding composition comprising about 95 to 0 weight % α-calcium sulfate hemihydrate, 0 to about 95 weight % cement, said α-calcium sulfate hemihydrate and/or said cement comprising between about 88 and 99 weight %, about 0.5 to about 8 weight % glass fibers and about 0.5 to about 4 weight % suspension agent, with reference to the dry weight, as well as water, and unmolding the resulting laminate after setting.

14. A process for producing an aircraft mold, comprising:

applying at least one base layer of a binder to an aircraft model from which a mold is to be made applying a glass fiber reinforced molding composition as a kneadable mass to said base layer in a wet-on-wet process, said molding composition comprising about 95 to 0 weight % α-calcium sulfate hemihydrate, 0 to about 95 weight % cement, said α-calcium sulfate hemihydrate and/or said cement comprising between about 88 and 99 weight %, about 0.5 to about 8 weight % glass fibers and about 0.5 to about 4 weight % suspension agent, with reference to the dry weight, as well as water, and unmolding the resulting laminate after setting.

15. The process as set forth in claim 13, wherein two base layers of the same binder are applied to the model in a wet-on-wet process.

16. The process as set forth in claim 13, wherein a binder composed of about 99.5 to 0 weight % α-calcium sulfate hemihydrate, 0 to about 99.5 weight % cement and about 0.5 to about 4 weight % suspension agent, with reference to the dry weight, as well as water is applied as at least one base layer.

17. The process as set forth in claim 14, wherein two base layers of the same binder are applied to the model in a wet-on-wet process.

18. The process as set forth in claim 14, wherein a binder composed of about 99.5 to 0 weight % α-calcium sulfate hemihydrate, 0 to about 99.5 weight % cement and about 0.5 to about 4 weight % suspension agent, with reference to the dry weight, as well as water is applied as at least one base layer.

* * * * *